(12) United States Patent
Hauer et al.

(10) Patent No.: US 6,776,041 B1
(45) Date of Patent: Aug. 17, 2004

(54) MICROMECHANICAL ROTATION RATE SENSOR

(75) Inventors: Joerg Hauer, Reutlingen (DE); Michael Fehrenbach, Reutlingen (DE); Karsten Funk, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/089,018

(22) PCT Filed: Aug. 26, 2000

(86) PCT No.: PCT/DE00/02931
§ 371 (c)(1),
(2), (4) Date: Aug. 15, 2002

(87) PCT Pub. No.: WO01/23837
PCT Pub. Date: Apr. 5, 2001

(30) Foreign Application Priority Data

Sep. 24, 1999 (DE) .......................................... 199 45 859

(51) Int. Cl.[7] ................................................. G01P 9/04
(52) U.S. Cl. .................................. 73/504.09; 73/504.18
(58) Field of Search .......................... 73/504.18, 504.13, 73/504.08, 504.04, 504.02, 504.09, 504.11, 504.12

(56) References Cited

U.S. PATENT DOCUMENTS 5,650,568 A * 7/1997 Greiff et al. ............. 73/504.09
5,915,276 A * 6/1999 Fell ......................... 73/504.13
5,955,668 A   9/1999 Saunders et al.

FOREIGN PATENT DOCUMENTS

DE        197 46 127        5/1999

OTHER PUBLICATIONS

Lutz et al., *A Precision Yaw Rate Sensor in Silicon Micromachining*, SAE Technical Paper, 980267.
Funk et al., *Surface–Micromachining of Resonant Silicon Structures*, The 8th International Conference on Solid–State Sensors and Actuators, Eurosensors IX, Stockholm, Sweden, Jun. 25–29, 1995, pp. 50–52.

* cited by examiner

*Primary Examiner*—Helen C. Kwok
(74) *Attorney, Agent, or Firm*—Kenyon & Kenyon

(57) ABSTRACT

A micromechanical yaw rate sensor having: a substrate having an anchoring device provided on the substrate; and an annular flywheel that is connected, via a flexural spring system, with the anchoring device in such a way that the area of connection with the anchoring device is located essentially in the center of the ring, so that the annular flywheel is able to be displaced, elastically from its rest position, about an axis of rotation situated perpendicular to the substrate surface, and about at least one axis of rotation situated parallel to the substrate surface. The anchoring device has two bases that are situated opposite one another and are connected fixedly with the substrate, connected with one another via a bridge. A V-shaped flexural spring of the flexural spring system is attached to each of the opposite sides of the bridge in such a way that the apex is situated on the bridge and the limbs are spread towards the flywheel with an opening angle.

8 Claims, 2 Drawing Sheets

MICROMECHANICAL ROTATION RATE SENSOR

FIELD OF THE INVENTION

The present invention relates to a micromechanical yaw rate sensor, having a substrate that has an anchoring device provided on the substrate, and having an annular flywheel that is connected, via a flexural spring device, with the anchoring device in such a way that the area of connection with the anchoring device is located essentially in the center of the ring, so that the annular flywheel is able to be displaced, elastically from its rest position, about an axis of rotation situated perpendicular to the substrate surface, and about at least one axis of rotation situated parallel to the substrate surface.

BACKGROUND INFORMATION

Yaw rate sensors are known from M. Lutz, W. Golderer, J. Gerstenmeier, J. Marek, B. Maihöfer, and D. Schubert, "A Precision Yaw Rate Sensor in Silicon Micromachining"; SAE Technical Paper, 980267, and from K. Funk, A. Schilp, M. Offenberg, B. Elsner, and F. Lärmer, "Surface-micromachining of Resonant Silicon Structures"; The 8th International Conference on Solid-State Sensors and Actuators, Eurosensors IX, Stockholm, Sweden, 25–29 Jun. 1995, pp. 50–52.

FIG. 2 shows a schematic top view of a known micromechanical yaw rate sensor.

In FIG. 2, the character 100 designates a substrate in the form of a silicon wafer. 10 designates an annular flywheel; 15, 15' designate flexural sensors; 25 designates a bridge; 18, 18' designate a respectively curved flexural spring, and 20, 20' designate a base. The latter parts are manufactured from polysilicon over a silicon oxide layer, the silicon oxide layer being removed later in the process through undermining, in order to form the parts so that they can be displaced in relation to substrate 100. Only the two bases 20, 20' are anchored on the substrate over the silicon oxide layer, and form fixed points of the sensor structure.

The functioning of the yaw rate sensor constructed in this manner is based on the principle of the law of conservation of angular momentum of a rotating system.

In general, the following holds:

$$\overline{M} = J \cdot \overline{\frac{d\omega}{dt}} \times \overline{\Omega},$$

where M is the moment of deviation, J is the mass moment of inertia, dω/dt is the angular velocity of the rotary oscillation, and Ω is the sought yaw rate.

If, in the known yaw rate sensor according to FIG. 2, annular flywheel 10, which is rotating about the z axis, is rotated about its y axis, this flywheel performs a rotation about the x axis. Given a constant angular velocity about the z axis, this rotation about the x axis, which is caused by the above moment of deviation M, is directly proportional to the sought yaw rate Ω.

In general, the problematic on which the present invention is based is that the first three natural frequencies corresponding to the x, y, and z axes, indicated in the Figure, do not have a position that is optimal or that can be optimized easily in the context of a process.

In particular, a modification of the sensor mass for the adjustment of the first three natural frequencies is undesirable, because this has effects that are disturbing with respect to measurement technology.

SUMMARY OF THE INVENTION

The underlying idea of the present invention is that the anchoring device has two bases, situated opposite one another, that are connected fixedly with the substrate and are connected with one another via a bridge. A V-shaped flexural spring of the flexural spring device is attached to each of the opposed sides of the bridge in such a way that the apex is located on the bridge, and the limbs are spread out towards the flywheel with an opening angle.

The first natural frequency about the z axis can be set by determining the spring width and spring length of the V-shaped flexural springs, corresponding to the operating frequency in the forced mode of the sensor. By modifying the opening angle between the respective spring limbs, the detection resonance frequency of the sensor, i.e., the rotation out of the plane of the substrate about the x or y axis, can be set. The ratio of the natural frequencies to one another determines, to a considerable extent, the sensor properties, such as for example sensitivity, immunity to interference, and temperature stability.

The inventive micromechanical yaw rate sensor therefore has, in relation to the known solutions, the particular advantage that via the opening angle, or the width and length, of the V-shaped flexural springs, the natural frequencies can be adjusted in a simple and precise manner, independently of one another.

According to a preferred development, the opening angle is equal for both V-shaped flexural springs of the flexural spring device. Thus, only one angle need be optimized for the natural frequencies.

According to a further preferred development, the V-shaped flexural springs of the flexural spring device are attached to the bridge in such a way that they form an X shape. This creates a symmetrical shape of the flexural springs.

According to a further preferred development, the opening angle is selected such that the natural frequency about the axis of rotation situated perpendicular to the surface of the substrate is smaller than each natural frequency about an axis of rotation situated parallel to the surface of the substrate. In this way, an extraordinarily positive acquisition characteristic can be achieved.

According to a further preferred development, the bases at the opposed sides are fashioned with a wedge shape. Here, the bridge connects the two wedge tips with one another. In this way, the sensor obtains a good capacity for displacement about the z axis.

According to a further preferred development, the bridge is suspended freely over the substrate.

According to a further preferred development, it can be manufactured using silicon surface micromechanical technology. The use of surface micromechanical technology to manufacture the inventive micromechanical yaw rate sensor, specifically the series production process having a thick epipoly layer, typically 10 μm thick, enables the formation of a rigid sensor structure, which enables a low cross-sensitivity to be achieved.

DETAILED DESCRIPTION

Figure 1:
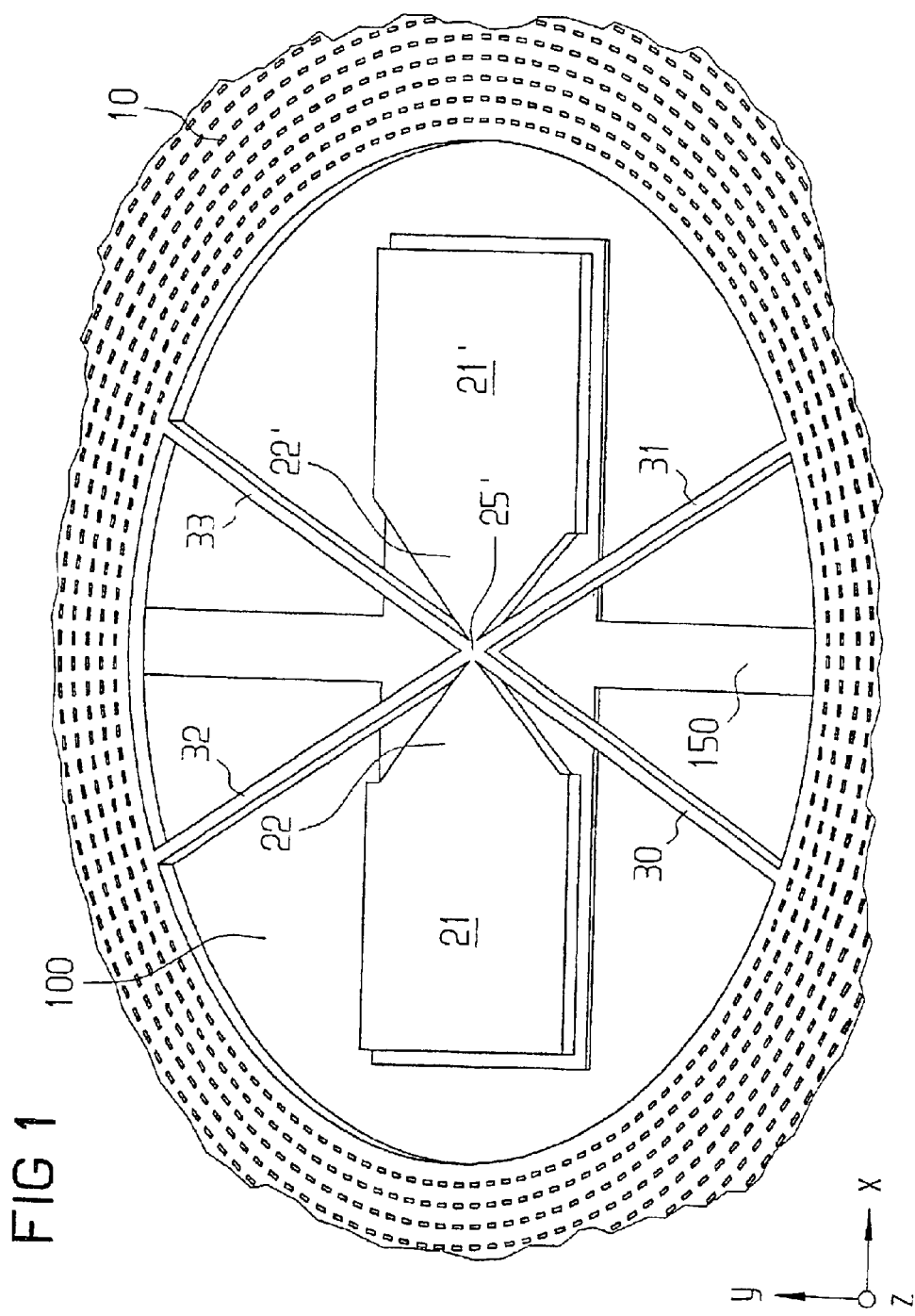
FIG. 1 shows a schematic top view of a specific embodiment of the inventive micromechanical yaw rate sensor.

In the Figures, identical reference characters designate identical or functionally identical components.

FIG. 1 shows a schematic top view of a specific embodiment of the inventive micromechanical yaw rate sensor.

In FIG. 1, in addition to the reference characters already introduced, 30–33 designate flexural spring limbs of two V-shaped flexural springs, 25' designates a bridge, 21, 21' designate bases, and 150 designates an electrical supply line.

Figure 2:
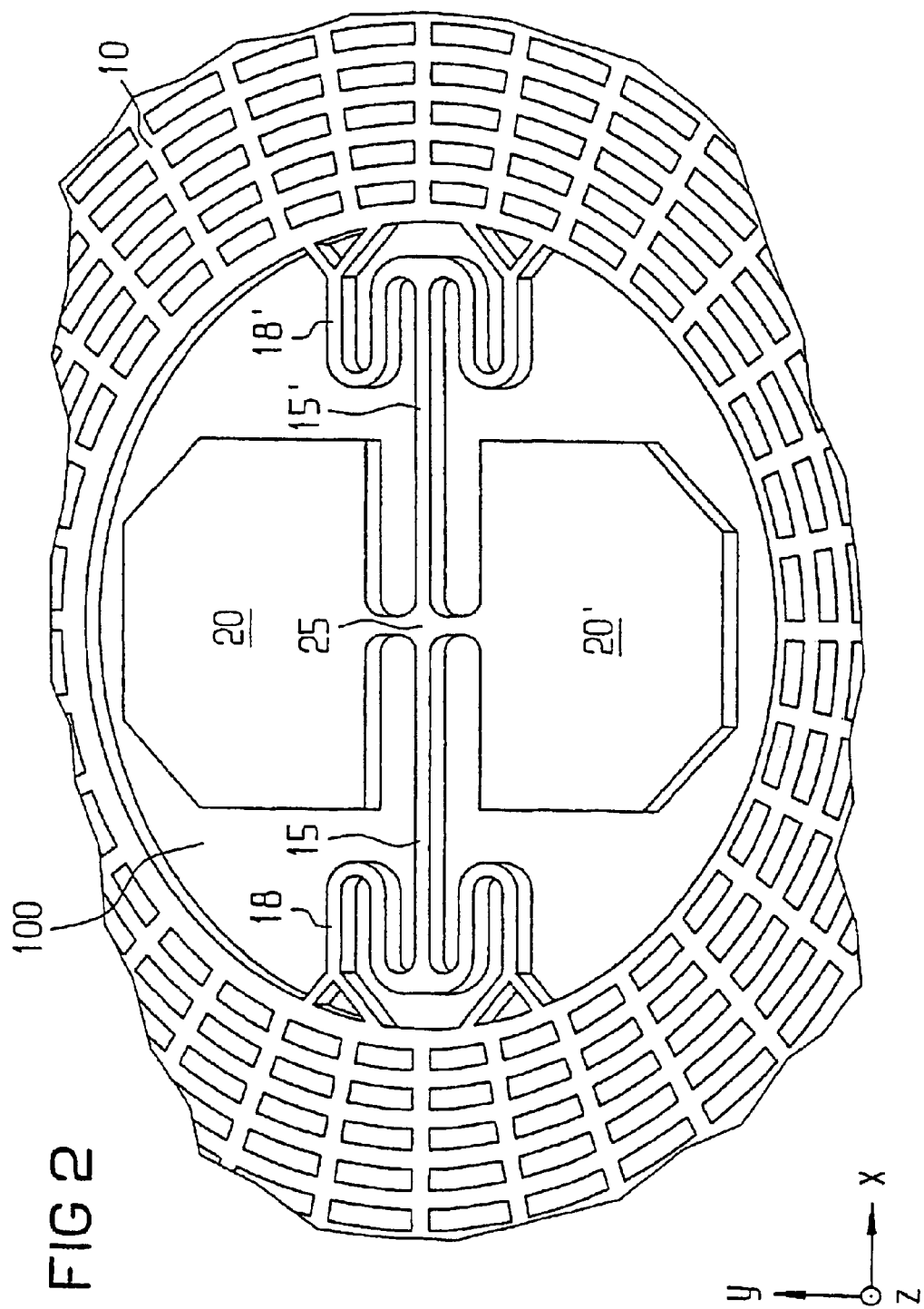
FIG. 2 shows a schematic top view of a known micromechanical yaw rate sensor.

In the micromechanical yaw rate sensor according to this specific embodiment, as in the known example according to FIG. 2, annular flywheel 10 is connected with anchoring device 22, 22', 25' via a flexural spring device made up of the two V-shaped flexural springs, in such a way that anchoring device 20 is located essentially in the center of the ring, so that annular flywheel 10 so that the annular flywheel is able to be displaced, elastically from its rest position, about the z axis, situated perpendicular to the surface of the substrate, and about the x and y axes, situated parallel to the surface of the substrate.

However, anchoring device 22, 22', 25' has two bases 21, 21' situated opposite one another and connected fixedly with substrate 100, and fashioned with a wedge shape at the opposed sides, bridge 25' connecting the two wedge tips with one another. Bridge 25' is suspended freely over substrate 100 from bases 21, 21'.

At each of the opposite sides of bridge 25', one of the V-shaped flexural springs, made up of limbs 30, 31 or 32, 33, is attached in such a way that the respective apex is located on bridge 25', and limbs 30, 31 or 32, 33 are spread out towards flywheel 10 with an opening angle.

The opening angle is equal for the two V-shaped flexural springs of the flexural spring device, and the V-shaped flexural springs of the flexural spring device are attached to bridge 25' in such a way that they form a symmetrical X shape.

The first natural frequency about the z axis can be set by determining the spring width and spring length of limbs 30, 31, 32, 33 of the V-shaped flexural springs. By determining the opening angle between the respective spring limbs, the natural frequency can be set for the rotation out of the substrate plane about the x or y axis. The ratio of the natural frequencies to one another is determined such that the sensor properties, such as for example sensitivity, immunity to interference, and temperature stability, assume an optimized value specific to the application.

Here the opening angle is for example selected such that the natural frequency about the z axis, situated perpendicular to the substrate surface, is smaller than each natural frequency about an axis of rotation situated parallel to the substrate surface, i.e., the x or y axis.

The micromechanical yaw rate sensor according to this specific embodiment is preferably manufactured using silicon surface micromechanical technology.

Although the present invention has been specified above on the basis of preferred exemplary embodiments, it is not limited to these, but rather can be modified in a multiplicity of ways.

In particular, the geometry of the flywheel, as well as of the flexural spring systems, is not limited to the indicated examples. However, larger deviations from the symmetrical arrangement about the anchoring should be avoided whenever there is a danger that linear portions of the external acceleration will falsify the measurement result.

The described packaging and manufacturing process is likewise to be understood only as an example, and other methods, such as for example galvanic methods, can likewise be used to manufacture the yaw rate sensor.

What is claimed is:

1. A micromechanical yaw rate sensor, comprising:
   a substrate;
   a bridge;
   an anchoring device provided on the substrate and including two opposite bases that are connected fixedly with the substrate and that are connected with one another via the bridge;
   a flexural spring device; and
   an annular flywheel that is connected via the flexural spring device with the anchoring device such that an area of connection with the anchoring device is located essentially in a center of a ring of the flexural spring device, so that the annular flywheel is displaceable, elastically from a rest position, about an axis of rotation situated perpendicular to a surface of the substrate, and about at least one axis of rotation situated parallel to the surface of the substrate, wherein:
   at least one V-shaped flexural spring of the flexural spring device is attached to each of opposite sides of the bridge in such a way that an apex is situated on the bridge and limbs of the V-shaped flexural spring are spread towards the annular flywheel with an opening angle other than 90 degrees.

2. The micromechanical yaw rate sensor according to claim 1, wherein:
   the at least one V-shaped flexural spring includes a first V-shaped flexural spring and a second V-shaped flexural spring, and
   the opening angle is equal for the first V-shaped flexural spring and the second V-shaped flexural spring.

3. The micromechanical yaw rate sensor according to claim 2, wherein:
   the first V-shaped flexural spring and the second V-shaped flexural spring are attached to the bridge such that the first V-shaped flexural spring and the second V-shaped flexural spring form an X shape.

4. The micromechanical yaw rate sensor according to claim 3, wherein:
   the opening angle is selected such that a natural frequency about the axis of rotation situated perpendicular to the surface of the substrate is smaller than each natural frequency about the axis of rotation situated parallel to the surface of the substrate.

5. The micromechanical yaw rate sensor according to claim 1, wherein:
   the two opposite bases are in the shape of a wedge and include two wedge tips, and
   the bridge connects the two wedge tips with one another.

6. The micromechanical yaw rate sensor according to claim 1, wherein:
   the bridge is suspended freely over the substrate from the two opposite bases.

7. The micromechanical yaw rate sensor according to claim 1, wherein:
   the micromechanical yaw rate sensor can be manufactured using one of silicon surface micromechanical technology and another micromechanical technology.

8. A micromechanical yaw rate sensor, comprising:
   a substrate;
   a bridge;
   an anchoring device provided on the substrate and including two opposite bases that are connected fixedly with the substrate and that are connected with one another via the bridge;

a flexural spring device; and an annular flywheel that is connected via the flexural spring device with the anchoring device such that an area of connection with the anchoring device is located essentially in a center of a ring of the flexural spring device, so that the annular flywheel is displaceable, elastically from a rest position, about an axis of rotation situated perpendicular to a surface of the substrate, and about at least one axis of rotation situated parallel to the surface of the substrate;

wherein at least one V-shaped flexural spring of the flexural spring device is attached to each of the opposite sides of the bridge in such a way that an apex is situated on the bridge and limbs of the V-shaped flexural spring are spread towards the annular flywheel with an opening angle; and wherein the opening angle is selected such that a natural frequency about the axis of rotation situated perpendicular to the surface of the substrate is smaller than each natural frequency about the axis of rotation situated parallel to the surface of the substrate.

* * * * *